United States Patent [19]
Grigsby et al.

[11] Patent Number: 5,958,171
[45] Date of Patent: Sep. 28, 1999

[54] METHOD OF MAKING A STRUCTURAL MEMBER

[75] Inventors: John M. Grigsby, Marietta; Jeffrey C. Banks, Austell; John M. Grigsby, Jr., Atlanta, all of Ga.

[73] Assignee: North American Container Corporation, Mabelton, Ga.

[21] Appl. No.: 08/968,834

[22] Filed: Nov. 17, 1997

Related U.S. Application Data

[60] Continuation of application No. 08/389,259, Feb. 15, 1995, abandoned, which is a division of application No. 08/066,342, May 24, 1993, Pat. No. 5,520,982.

[51] Int. Cl.[6] .................................................. B32B 31/18
[52] U.S. Cl. .......................... 156/254; 156/250; 156/292
[58] Field of Search ................................... 156/247, 248, 156/250, 254, 289, 290, 292

[56] References Cited

U.S. PATENT DOCUMENTS

| | | |
|---|---|---|
| 1,619,011 | 3/1927 | Agar . |
| 1,955,833 | 4/1934 | Romanoff . |
| 2,036,467 | 4/1936 | Ellis .......................................... 428/920 |
| 2,432,295 | 12/1947 | Donahue ............................ 108/51.3 X |
| 2,587,171 | 2/1952 | Knewstubb ............................. 156/254 |
| 3,092,046 | 6/1963 | Davidson ............................... 108/51.3 |
| 3,441,959 | 4/1969 | Sears ....................................... 156/288 |
| 3,549,449 | 12/1970 | Windecker ............................. 156/254 |
| 3,730,797 | 5/1973 | Jensen ..................................... 156/254 |
| 3,743,568 | 7/1973 | DeWolf . |
| 3,929,536 | 12/1975 | Maughan . |
| 3,982,057 | 9/1976 | Briggs et al. ....................... 108/51.3 X |
| 4,158,712 | 6/1979 | Degens .................................... 156/288 |
| 4,399,972 | 8/1983 | McCulloch ........................ 108/51.3 X |
| 4,424,753 | 1/1984 | Eatherton . |
| 4,816,314 | 3/1989 | Prawdzik ................................ 156/288 |
| 5,076,176 | 12/1991 | Clasen .................................... 108/51.3 |
| 5,218,913 | 6/1993 | Winebarger et al. ............... 108/56.1 X |
| 5,275,682 | 1/1994 | Gotz ........................................ 156/289 |
| 5,320,048 | 6/1994 | Feiner ................................ 108/51.3 X |
| 5,366,790 | 11/1994 | Liebel . |
| 5,386,786 | 2/1995 | Kilpatrick et al. ..................... 108/51.3 |
| 5,433,156 | 7/1995 | Hutchison .......................... 108/56.1 X |
| 5,461,988 | 10/1995 | Cummings et al. ................... 108/51.3 |

FOREIGN PATENT DOCUMENTS

| | | | |
|---|---|---|---|
| 4314504 | 12/1993 | Germany ............................. 108/51.3 |
| 7710020-4 | 4/1979 | Sweden . |
| 2127773 | 4/1984 | United Kingdom ................. 108/51.3 |

OTHER PUBLICATIONS

Webster II New Riverside Dictionary, Houghton Mifflin Co., (1984) p. 1241.

Webster's II New Riverside Dictionary, Houghton Mifflin Co., (1984) pp. 172–173.

New Collegiate Dictionary A Merriam–Webster, Springfield, Massachusetts, USA (1977) p. 109.

ECO Pallet brochure (undated) ECO Pallets, United, 8210 South Nobales Hwy, Tucson, AZ 85706.

Jun. 5, 1993 Official Board Markets "GM Touts Sonoco Corner Supports".

New Pallet Concepts—Mar. 21, 1994, HoustonBusiness Profile p. 23.

*Primary Examiner*—Daniel Stemmer
*Attorney, Agent, or Firm*—Kennedy, Davis & Hodge

[57] ABSTRACT

A structural member formed from a billet, each member comprising a plurality of elongate corrugated paperboard sheets bonded together with an adhesive and disposed between a top and a bottom cap, each cap comprising at least one ply of a fibreboard sheet, a pair of side caps of a solid fibreboard sheet bonded to respective side faces of the paperboard sheet and to the respective edges of the top and bottom caps. The billet comprises a plurality of structural members each separated by a corrugated paperboard rip-out sheet. A method of manufacture is disclosed in which the billet is built up of structural members and rip-out sheets. The billet is then ripped into planks which are ripped along the rip-out sheets to separate the structural members for use as a substitute member for wood cleats or members.

3 Claims, 8 Drawing Sheets

METHOD OF MAKING A STRUCTURAL MEMBER

This application is a continuation of Ser. No. 08/389,259, filed on Feb. 15, 1995, now abandoned, which is a divisional of Ser. No. 08/066,342, filed on May 24, 1993 now U.S. Pat. No. 5,520,982.

TECHNICAL FIELD

The present invention generally relates to containers for articles. More particularly, the present invention relates to a structural member and a method of making the structural member, for containers for heavy articles.

BACKGROUND OF THE INVENTION

Many types of manufactured goods must be packaged in containers for warehouse storage at the manufacturer's plant and for shipment by truck or rail car to a customer or to an intermediate distribution center. Often these manufactured goods are heavy and bulky, such lawn and garden tractors, outboard motors, large electrical motors, refrigerators, stoves, central air conditioners and heating units, and the like.

The container for these goods serves the functions of protecting the article from damage and providing a structure for handling and transporting the goods. The container for such large and heavy goods must have sufficient structural strength to allow the goods to be handled and to be stacked five or six containers high in a warehouse. Stacking saves warehouse space and associated freight shipping costs. For example, garden tractors typically weight up to 500 pounds each and typically are between forty-eight and sixty inches long. One manufacturer produces over 2000 tractors per day. The manufacturer must be able to place at least six of the tractors in a stack to reduce the required warehouse space for handling this large volume of production.

In the case of odd-shaped goods such as lawn tractors, outboard motors, electric motors, and the like, the goods themselves typically have no natural top or wall that allows the inherent strength of the goods to assist in stacking. The container itself therefore must possess sufficient strength in its sidewalls to allow several thousand pounds of package goods to be stacked on top of the lower-most container. It is standard procedure in the packaging industry to design such structural containers with adequate safety factors to insure that stacks of goods do not collapse due to stress in stacking and due to environmental changes such as conditions of high heat and humidity. Corrugated paperboard, for instance, may lose up to 50% of its stacking strength during conditions of high humidity when the paper liners and medium composing the corrugated board absorb atmospheric moisture. It is typical to design a container with a safety factor of 4-to-1 or 4.5-to-1 times the actual calculated load on the bottom container. For example, garden tractors weighing 325 pounds are to be stacked six high. The bottom container carries the load of five containers and tractors. The load equals 5 times 325 pounds, or a total of 1625 pounds impressed upon the lowermost container in the stack. Using a 4-to-1 safety factor, the container for these goods would need to have a top load compression strength of 6500 pounds.

In addition, containers are stacked in tractor trailers or rail cars transporting the goods. It is often desirable to stack goods two, three, or four containers high depending on the physical height of the container and the inside height of the truck trailer or rail car. Stacking saves space and reduces freight costs per container. Transit by truck or rail car however places great torque or twisting forces on the lower containers in a stack. These forces arise from road shocks, stops, starts, and cornering. The container therefore must have sufficient structural strength so as not to collapse in transit. In addition, handling of containers by forktruck or squeeze (clamp) truck exerts extreme force on the bottoms and side walls of the containers carrying heavy items. Such handling is often rough and at a fast pace. It is not uncommon for such containers to be handled many times through a distribution cycle and the container must be rugged enough to withstand this repetitive handling.

To meet the need for packaging heavy, large goods, various containers have been developed and used. These include wooden crates and corrugated packages. Wooden crates include wood-sided boxes and wire-bound wooden boxes. Wooden boxes are expensive, heavy and bulky, and are difficult to assemble on a manufacturing line. Corrugated packages include all-corrugated containers and wood reinforced corrugated containers. The all-corrugated packages include internal corrugated paperboard rollups that form corner posts for compression strength.

Wood reinforced corrugated containers however are the choice for many manufacturers of these large and heavy goods. One such container is described in U.S. Pat. No. 4,832,256 issued to Grigsby. Wood members called cleats are fixed to the sidewall of the corrugated paperboard body of the container. The cleats provide support and bracing for stacking, handling and shipment of the container as described above. The width and thickness of the wood cleats are designed to provide the desired performance characteristics of the container with the specified safety factor, as discussed above. Typically, a large container such as for a garden tractor or outboard motor would utilize one cleat fixed vertically near each corner of the container. Other vertical cleats for stacking strength are often located centrally on the other length or width panels of the body of the container. These central cleats provide additional support. A wooden base or pallet is typically provided on which the product to be packaged is fixed, either by chocking, banding, or combination. A wooden top frame often is also provided, which rests on the upper ends of the vertical wood cleats. The top frame forms a reinforced upper surface that spreads or distributes the load of other containers stacked on top. The top frame further protects the goods in the container from damage, for example, preventing a smaller package placed on top from falling through during transit.

There are many advantages of wood reinforcement cleats for corrugated containers. Wood is extremely strong on a weight basis, and is easily machinable with standard cutting, ripping and tenoning machines. Tenoning machines cut special notches or extensions which mate with a recess, called a mortise, to form a locking joint in a wood frame. Wood will not lose its strength in conditions of high heat and humidity as does corrugated paperboard. Wood however, has several major disadvantages. Increasing environmental awareness has become a factor in container design and use. Wood is difficult to readily recycle, and hence many wood packaging components are finally disposed in landfills. Available landfill sites however are becoming full and are being closed. If landfill disposal is available, fees for dumping such bulky materials are increasing. Many customers of manufacturers of the heavy durable goods described above therefore are demanding fully recyclable packaging. In response, the recycling industry has increased the number and locations of processing mills where corrugated containers are re-pulped to form new rolls of recycled liner board.

In addition, wood supplies are limited and this causes the price of wood to increase. Cutting boards for packaging wood requires harvesting of old growth, large trees, which are more importantly needed for construction lumber. Corrugated paperboard and solid fibreboard is made from pulp wood which are typically small trees rapidly grown on managed tree farms. Wood residue from sawmills and wood-using industries also can be ground up and pulped into kraft paper for solid fibre and corrugated paperboard.

Corrugated paperboard by itself, however, does not have the necessary strength to replace wood in heavy structural uses, such as the packaging requirements desired above.

Tubes of corrugated paperboard and of fibreboard have been manufactured and used as vertical cleats in containers. Typically these tubes are circular or triangular in cross-section. Corrugated paperboard is formed with relatively thin paper liners and fluted mediums, so the density of corrugated paperboard is low compared to wood in a given sized member. The associated compression and bending strength of a paperboard cleat is significantly less than with a wood member. Therefore, a large number of scored and folded forms are necessary to provide a container with sufficient top load compression strength to replace a wood cleat. The size and cost of such numerous forms typically are not competitive with wood. The goods may also have dimensional constraints that limit the placement and size of the support forms. An increased number of corrugated columns and the internal dimension constraints may require an excessively large container to hold the goods and the support forms. It is always desirable, however, to keep the outside dimensions of the container as small as possible, so that freight and storage costs can be minimized. If the product to be packaged is of such a shape as to fit relatively tightly into the corners of the container, then a large corner column cleats may not be allowed. One example of this is the wheels of a lawn tractor fitting closely into the corners of the container. The container would have to be larger to accommodate the goods and the support forms.

Accordingly, there is a need in the art for an improved structural member for use in containers for heavy goods.

SUMMARY OF THE INVENTION

The present invention provides an improved structural member for use in corrugated containers for heavy goods, and provides a method of manufacturing such structural member. Generally described, the structural member comprises a plurality of elongate corrugated paperboard sheets bonded together with an adhesive in a stack. A top and a bottom cap, each comprising at least one ply of a fibreboard sheet, are bonded to a respective one of the outer paperboard sheets in the stack. A pair of side caps of a solid fibreboard sheet bond to respective side faces of the paperboard sheets and to the respective edges of the top and bottom caps.

In another aspect of the invention, the structural member features at least one web disposed between two adjacent sheets of corrugated paperboard and equally spaced between the top and the bottom caps.

Further, the present invention provides a billet for from which the structural member is manufactured. The billet comprises at least two cores of a structural member separated by a corrugated paperboard rip-out sheet. Each core of the structural members comprises a top and a bottom cap of fibreboard sheet bonded to and sandwiching a plurality of corrugated paperboard sheets.

The present invention also provides a method of manufacturing a structural member. The method forms at least two core layers, each comprising a plurality of corrugated paperboard sheets stacked together and bonded between a top and a bottom cap of fibreboard sheets. A rip-out sheet of corrugated paperboard is bonded between adjacent core layers to form a billet having at least two core layers. The billet is ripped at predetermined widths to make a plurality of elongate core planks. A pair of side caps of fibreboard sheets then are bonded on the lateral sides of the core plank to form a capped plank. The capped plank is ripped along the rip-out sheet to separate at least two structural members.

Accordingly, it is an object of the present invention to increase the compression strength of wood-substitute structural members.

It is another object of the present invention to increase the bending strength or stiffness of a wood-substitute structural member.

It is another object of the present invention to provide a structural member that is easily workable on standard wood-cutting equipment typically in use in the container manufacturing industry.

It is another object of the present invention to decrease the use of materials in containers which are not readily recyclable.

It is another object of the present invention to increase the usefulness of structural members in forming mortises and tenons to make locking joints for frame construction.

It is another object of the present invention to reduce the cost of structural materials in comparison to wood structural materials.

It is another object of the present invention to reduce the weight of the structural member compared to wood.

These and other objects, advantages, and features of the present invention will become apparent from a reading from the following detailed description of the invention and the claims in view of the appended drawings.

BRIEF DESCRIPTION OF THE DRAWINGS

FIG. 6b is a bottom and end perspective view of the structural member and mortise illustrated in FIG. 6a.

FIG. 7b is a perspective view of the folded framing member shown in FIG. 7a.

FIG. 7c is a side detailed view of the notches cut in the framing member illustrated in FIG. 7a.

FIG. 8c is a side view illustrating the detail of the notch cut in the framing member of FIG. 8a.

DETAILED DESCRIPTION OF THE PREFERRED EMBODIMENTS

Figure 1:
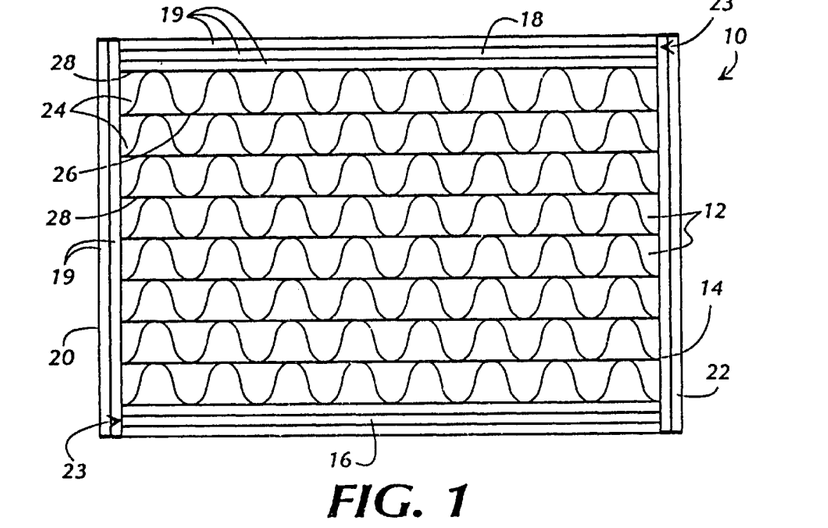
FIG. 1 is a cross-sectional view of an elongate structural member according to the present invention.

Referring now in more detail to the drawings, in which like numerals indicate like parts throughout the several views, FIG. 1 illustrates an end cross-section view of a preferred embodiment of an elongate structural member 10 for use as a substitute of wood members, particularly in corrugated paperboard shipping containers. The structural member 10 is a solid fibre-corrugated paperboard composite that is bonded together with an adhesive. The structural member 10 comprises a plurality of corrugated paperboard sheets 12 laminated together with an adhesive bond 14 between adjacent paperboard sheets. A bottom cap 16 and a top cap 18 sandwich the plurality of paperboard sheets 12. The bottom and top caps 16 and 18 bond with an adhesive to one of the respective outer paperboard sheets 12 with an adhesive. The caps 16 and 18 comprise one or more plies 19 of a fibreboard sheet. The adhesive bonds the plurality of fibreboard sheets together. A pair of side caps 20 and 22 attach with adhesive to the sides of the structural member 10 to cover the open corrugated paperboard sheets 12 and the edges 23 of the caps 16 and 18. The sides 20 and 22 comprise one or more plies 19 of fibreboard sheets. The plies adhere together with an adhesive. In the illustrated embodiment, the sides 20 and 22 have two plies of one-eighth inch thick fibreboard, the bottom and top caps 16 and 18 have three plies of the fibreboard, and there are four plies of double-wall corrugated paperboard sheets.

The corrugated paperboard sheets 12 preferably are lightweight and generally contribute little to the compression strength of the structural member 10. The caps 16 and 18, the sides 20 and 22, and the thickness and width of the structural member 10 provide the compression strength, bending resistance and stiffness for the member. The corrugated paperboard sheets generally provide a form on which the solid fibre caps and sides are built to give the required overall cross-sectional width and the wall thickness necessary to achieve a desired compression strength, bending resistance, and stiffness. The corrugated paperboard sheets 12 further provide a central structure for forming joints with the structural member 10, as discussed below.

In the embodiment illustrated in FIG. 1, the corrugated paperboard sheets 12 are double-wall corrugated paperboard sheets. As known to those of ordinary skill in the art, double-wall corrugated paperboard comprises two layers of fluted medium 24 separated by an inner liner 26 of paper. The sides of the double-wall corrugated sheet 12 are closed by a pair of outer liners 28. The outer liners 28 are preferably sheets of kraft paper.

The thickness of each layer of corrugated paperboard 12 is primarily a function of the flute size. Three basic flute sizes are standard in the industry, in which A identifies the highest flute, C is next, with B the smallest flute. The industry standard double-wall corrugated paperboard uses a B-C flute configuration, but A-A flute, A-C flute and C-C flute are also typically manufactured. In general, the flute size is of little consequence structurally, but is of practical consideration in that the thicker the flute, the fewer number of corrugated plies are necessary to achieve a specified overall thickness of the structural member 10. A structural member 10 manufactured with A-A flute would require the fewest number of plies, A-C the next fewest, C-C, and B-C with the least. Fewer plies require fewer glue bonds which reduces both the materials cost and the labor cost in laminating the web plies of paperboard 12 together, as discussed below. These cost savings are balanced by the ready availability of B-C flute which is typically produced in much larger volumes and therefore is generally less expensive per thousand square feet than other flute configurations.

In an alternate embodiment (not illustrated), the structural member 10 is manufactured with triple-wall corrugated paperboard. This reduces the number of plies and glue bonds necessary to manufacture the structural member 10. However, triple-wall board is not manufactured by many companies, and material costs may be higher.

In another alternate embodiment, the corrugated paperboard sheets 12 are single-wall. However, this increases the number of plies and glue bonds of paperboard sheets necessary to manufacture the structural member 10.

Another alternate embodiment uses open-face corrugated board that does not have an outer liner. Although open-face corrugated paperboard is available in rolls, and is relatively inexpensive in general, bonding between adjacent plies is more difficult and production of the structural member 10 is slower due to difficulties in applying the adhesive.

Figure 2:
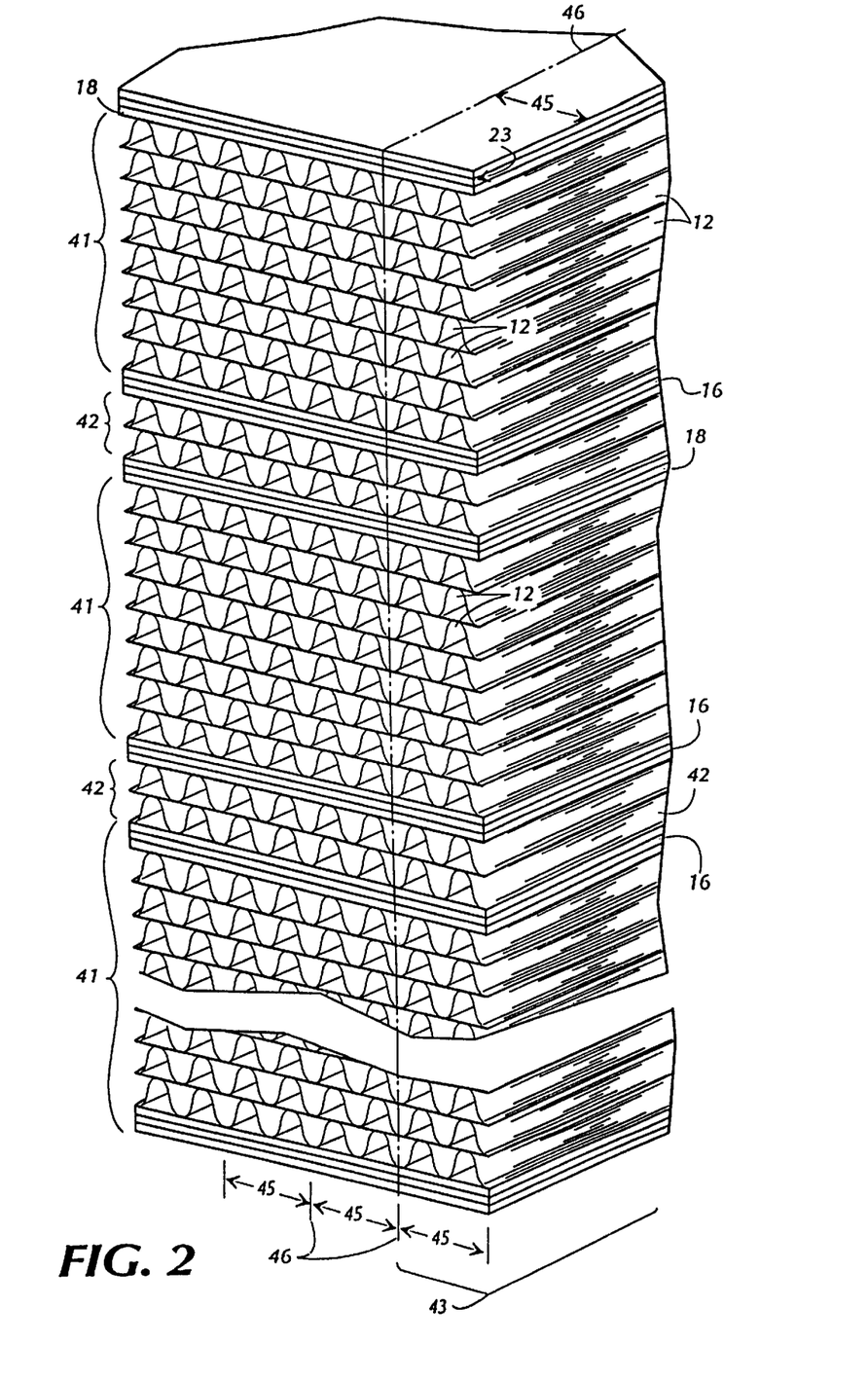
FIG. 2 is a perspective view of a billet from which a plurality of the structural member illustrated in FIG. 1 are formed.

The structural member 10 illustrated in FIG. 1 is preferably manufactured by forming and cutting an elongate billet 40 illustrated in perspective end and side view in FIG. 2. The billet 40 comprises a plurality of separated cores 41. The cores 41 each comprise the bottom and top caps 16 and 18 together with the plurality of corrugated paperboard sheets 12 that define the thickness of the structural member 10. As a group the caps 16 and 18 and paperboard sheets 12 are referred to herein as the core 41. The core 41 can be manufactured in selected widths and thicknesses, by changing the number of plies used, depending on the requirements for the container. The billet 40 comprises a plurality of the cores 41, each separated by a rip-out layer 42. The rip-out layer 42 preferably is double-wall corrugated paperboard, for a purpose discussed below.

A plurality of cores 41 are assembled in the billet 40 to a selected thickness of the billet 40. A plurality of core planks 43 are then cut from the billet 40 by ripping to a predetermined width 45 as indicated by the spaced-apart lines 46. In a preferred embodiment, the width for cutting the core planks 43 are 1 and ½ inches to about 2 inches. The width can be changed as needed to make a plank of a selected thickness. The core planks 43 cut from the billet 40 are preferably intermediate products, but as discussed below, can be used for framing members.

The side caps 20 and 22 illustrated in FIG. 1 are subsequently attached to the core plank 43 to cover the plies 12 of paperboard sheets and the edges 23 of the caps 20 and 22, as discussed below. The resulting plank 44 is referred to herein as a capped plank or plank. The plank 44 is then ripped through the rip-out sheets 42 to separate individual structural members 10 from the plank.

Figure 3:
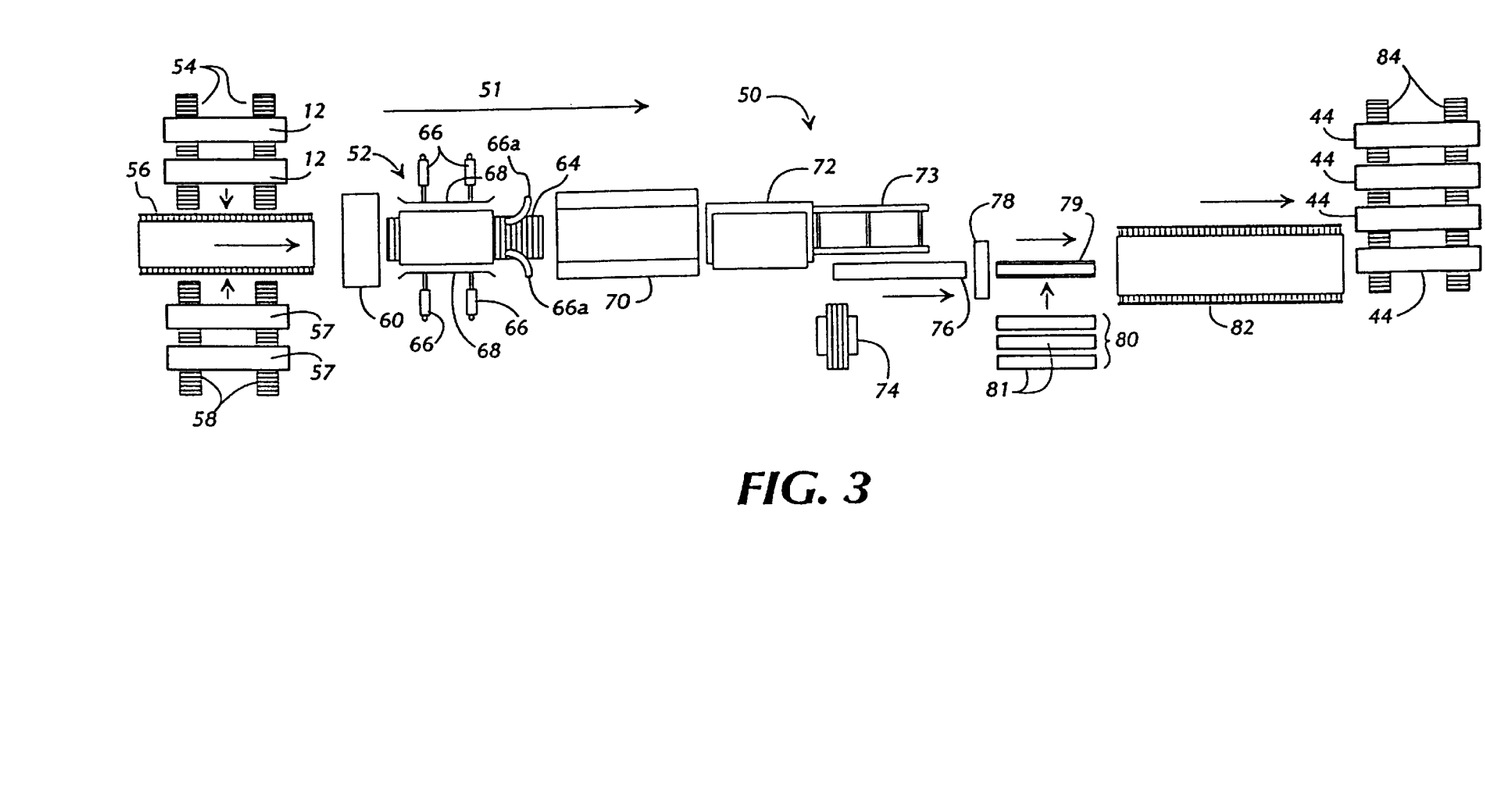
FIG. 3 is a top plan view of a manufacturing line for making the structural member illustrated in FIG. 1.

FIG. 3 is a top plan view of a manufacturing line 50 having a direction of flow 51 for assembling the billet 40 and cutting the plurality of structural members 10 from the billet 40. The manufacturing line 50 has a billet forming station 52. A pair of conveyors 54 carry a plurality of corrugated paperboard sheets 12 to a feed conveyor 56. A pair of conveyors 58 carry a plurality of fibreboard sheets 57 for the bottom and top caps 16 and 18 to the feed conveyor 56. The conveyors 54 and 58 preferably hold stacks of the paperboard and the fibreboard for placement on the feed conveyor 56 selectively.

The paperboard sheets and fibreboard sheets are selectively removed in sequence to build the billet 40, as discussed below. The feed conveyor 56 moves the corrugated paperboard sheets and the fibreboard sheets into and through a glue spreader 60. The glue spreader 60 applies an even layer of adhesive to a surface of the corrugated paperboard sheet or the fibreboard sheet passing through.

The billet forming station 52 receives the glued sheets from the glue spreader 60 on a roller conveyor 64. The billet 40 is built on the roller conveyor 64 using the glued sheets selected in sequence from the conveyors 54 and 56. A plurality of squaring cylinders 66 connect to squaring plates 68 on the sides of the billet forming station 62. The squaring cylinders 66 preferably are hydraulically operated cylinders. The cylinders 66 push the squaring plates 68 against the side of the billet 40 as it is assembled by layering the paperboard and fibreboard sheets. The squaring cylinders 66 and the plates 68 align the billet 40 at it is assembled.

The roller conveyor 64 transfers the assembled billet 40 to a compression station 70 which includes a plurality of rollers for forcibly laminating the paperboard sheets and fibreboard sheets together. Such compression apparatus are known to those of ordinary skill in the art. The length of the compression station 70 depends on the curing time of the adhesive and the speed of the conveyor belt carrying the billet 40 through the compression station 70.

A carriage 72 receives the compressed billet 40. The carriage 72 travels laterally on rails 73 past a band head rig 74 for ripping the billet 40 into the core planks 43, as illustrated by the lines 46 in FIG. 2. In a preferred embodiment, the band head rig 74 has a double-sided band saw which enables the billet 40 to be cut in both a forward and a reverse pass of the carriage 72.

A plank conveyor 76 receives the core planks 43 cut from the billet 40. The plank conveyor 74 transfers the core plank from the head rig 70 to a glue spreader 78. The glue spreader 78 applies adhesive to the lateral sides of the core plank 43. The glued core plank 43 is placed on a conveyor 79 for receiving the side caps 20 and 22. An adjacent stacking area 80 includes a supply of fibreboard caps for the sides 20 and 22 of the structural member 10. A compressor 82 receives the core planks 43 from the conveyor 79 to laminate the sides 20 and 22 to the core planks. A take-away conveyor 84 receives the compressed capped planks 44. Each plank 44 is subsequently ripped longitudinally along the rip-out sheets 42 releasing the structural members 10 having the desired width and thickness for a replacement for a wood member. The structural member 10 is cut to length and processed on conventional wood cutting equipment, such as saws and other devices to form tenons, mortises, and beveled ends, as discussed below.

The billet 40 is manufactured oh the assembly line illustrated in FIG. 3. One sheet of fibreboard 57 for the bottom cap 16 is removed from the conveyors 58 and placed on the feed conveyor 56. The sheet rolls on the feed conveyor 56 into the glue spreader 60 which applies a metered coat of adhesive to the upper surface of the fibreboard. The sheet is positioned on the roller conveyor 64 between the squaring plates 68. Additional sheets of fibreboard are similarly coated with adhesive in the glue spreader and placed in a stack on the roller conveyor 64. In a preferred embodiment, three sheets of fibreboard are used for the bottom and top caps 16 and 18, respectively.

After the fibreboard bottom cap 16 is positioned on the roller conveyor 64, the corrugated paperboard center is built. One of the double-wall corrugated sheets 12 is removed from the conveyor 54 and placed on the feed conveyor 56. The corrugated paperboard sheet is passed through the glue spreader 60 for applying a film of adhesive to the sheet. The corrugated paperboard sheets are stacked on the billet 40 in sequence. In the illustrated embodiment, four plies of double-wall corrugated paperboard sheets 12 are used.

The cap 18 of fibreboard sheets is then placed on the billet 40 in the manner discussed above for the cap 16. The cap 18 has sufficient plies of fibreboard sheets to yield the desired wall thickness of the structural member 10 to be made from the billet.

A double-wall sheet of corrugated paperboard is then passed through the glue spreader 60. This sheet is placed on the billet 40 for the rip-out sheet 42 as best illustrated in FIG. 2. A second core 41 is then assembled in sequence as discussed above on top of the previous core.

This process of gluing and placing the plies of fibreboard and corrugated paperboard for the cores 41 continues until the billet 40 is assembled to the desired thickness and having two or more cores 41. In a preferred embodiment, the billet 40 is about 12 inches thick. The resulting core planks 43 have a width of about 12 inches, a thickness equal to the cutting width 45, and a length equal to the length of the billet 40. During assembly, the squaring cylinders 66 are operated to drive the squaring plates 68 against the sides of the billet 40. The squaring plates 68 force the plies into alignment to square the billet 40. In the illustrated embodiment, a pair of squaring cylinders 66a are disposed forward of the billet 40 for squaring the front side, in the event the glue spreader 60 pushes the sheets too far forward. Although not illustrated, it may be necessary to include a second set of squaring cylinders 66a behind the billet 40 for squaring the back side. The last fibreboard ply for the cap 18 on the uppermost core 41 does not receive adhesive in the glue spreader 60.

The billet 40 typically is approximately 43 inches wide by 12 inches thick by 72 inches long. In practice, the lengths of such billets are set to yield the proper length for the finished parts to be produced. Thus the billet can be formed to standardized lengths for general use to maximize production efficiency. The resulting planks of structural material can be re-sawn to form parts or other structural uses in the same manner as lumber planks are used. The replacement material of the present invention provides uniformity in comparison to lumber material. Lumber typically contains knots, has splits, may warp and rot. The waste factor of the replacement material is significantly lower than that for lumber. Further, the waste is fully recyclable, as opposed to lumber waste which typically is disposed of in landfills.

The assembled billet 40 is fed by the roller conveyor 64 into the compression station 70 which applies compressive force to the billet 40 as it passes through the compression station. The speed of the transfer is correlated with the curing time of the particular adhesive so that the billet 40 emerges at the end of the compression station 70 with the plies of paperboard and fibreboard fully bonded. The adhesive can be starch, PVA cold setting glue, dextrin, or other similar adhesive.

The billet 40 is received from the compression station 70 on the carriage 72 which is capable of forward and reverse travel. The billet 40 is carried by the carriage past the head rig band saw 74 which rips the billet at predetermined widths 45 to form the core planks 43 having a predetermined thickness. Such carriage and band saw cutting apparatus is conventional for wood board cutting. The apparatus is set to cut the predetermined width 45 and then index laterally after each pass through the billet 40. The style of the blade tooth of the band saw is preferably different then that for wood to insure smooth cuts through the billet, which has a different density and fibre orientation than wood.

The width of the planks cut on each pass of the billet through the head rig is preset and determined by the desired finish thickness of the structural member 10. The width of the cut defined by the indexing of the carriage takes into consideration the combined thickness of the side caps 20 and 22 which are subsequently laminated to the plank 44. The cut by the head rigs 74 through the billet 40 therefore yields a core plank 43 of less thickness than the finished capped plank 44.

The core planks 43 are then rotated and passed through the double-sided glue spreader 78 which applies a film of adhesive to the exposed sides of the sheets 12 and the edges 23 of the caps 16 and 18. One of the solid fibreboard sheets is removed from the stack 81 and is placed on the conveyor 79 for receiving one of the core planks 43 from the glue spreader 78. This sheet is the side cap 20. Another of the fibreboard sheets is similarly placed on "top" of the core plank 43 which is then passed through the compressor 82 to laminate the sides 20 and 22 to the plank. The capped planks 44 emerge from the compressor 82 as a finished board ready for shipment to manufacturing areas for ripping to separate the structural member 10 from the plank 44. The structural member 10 undergoes further operations such as cutting to length, tenoning, and mortising, as required for particular cleats or frame members. This is discussed below.

During the final ripping of the planks 44, the rip-out sheets 42 are utilized. The plank 44 is placed on a saw and cut longitudinally along each rip-out sheet 42 to separate the structural members 10. The plank 44 is pre-engineered for a net final width when the structural members 10 are formed by cutting along the rip-out layer 42 of double-wall corrugated paperboard. Although other widths can be cut from the plank 44, the resulting sequence of paperboard sheets 12 and fibreboard sheets 18 and 20 will vary. The strength of the plank 44 may thereby be lessened. This may be of little consequence if the separated portions of the plank are used flat, such as a base or top frame cross piece. For use as a column, the planks 44 preferably are cut on the rip-out sheets 42 to the pre-engineered widths to ensure that the column has the designed compression strength.

The manufacturing discussed above of the replacement structural member 10 is a continuous flow process with minimal waste and labor. The billet bonding adhesive can be starch, as used in corrugated paperboard, PVA cold setting glue, dextrin, or other suitable adhesives.

In an alternate embodiment (not illustrated) the head rig 70 is a multi-band, thin kerf bandsaw. In this embodiment, a plurality of core planks 43 are cut simultaneously from the billet 40.

Figure 4:
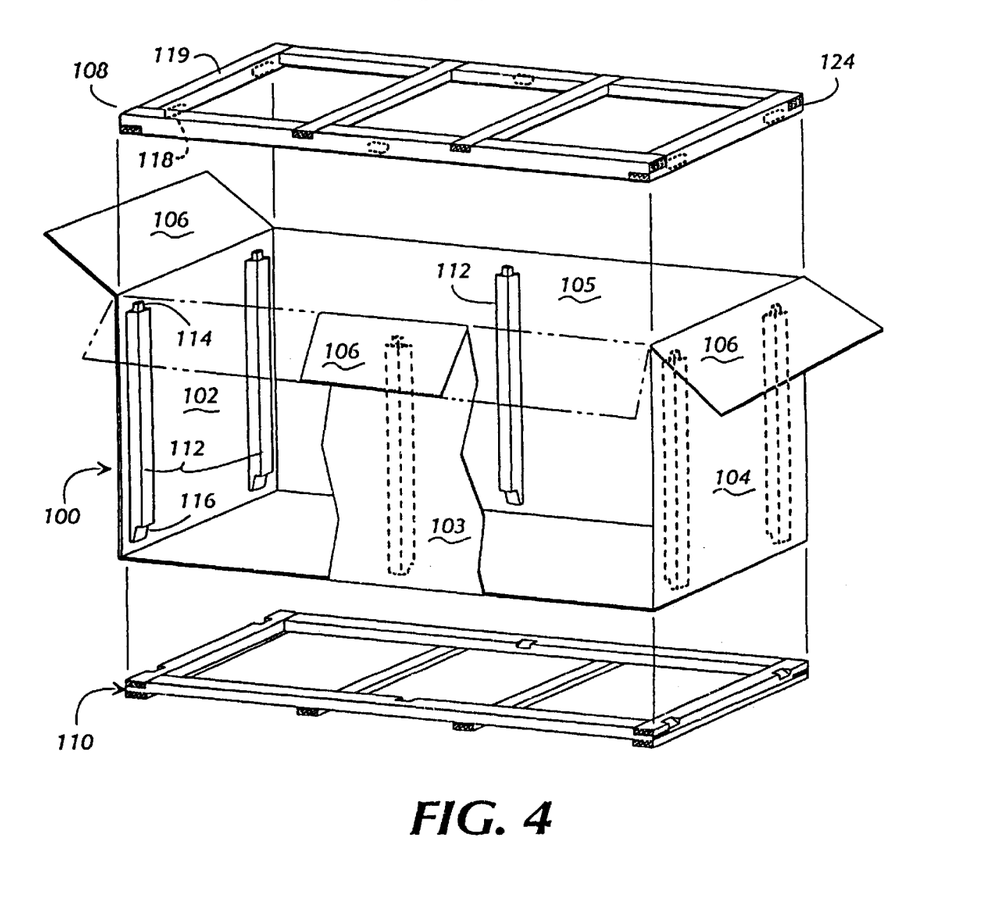
FIG. 4 is a perspective view of a corrugated paperboard container having cleats and frame members made from the structural member shown in FIG. 1.

FIG. 4 is a perspective cut-away view of a corrugated paperboard container 100 having cleats and frame members, as discussed below, made from the structural member 10. The body of the container 100 preferably forms from a blank of corrugated paperboard material. The blank includes four main panels 102, 103, 104 and 105 foldably connected along three score lines, as is known in the art. The four main panels 102–105 form the four walls of the container 100. A manufacturer's joint, common in the industry, foldably connects to one of the main panels along a score. The manufacturer's joint allows the ends of the blank to be joined together with glue and staples to form the completed container 100. In the illustrated embodiment, a series of four top flaps 106 foldably connect to the main panels 102–105 along score lines for closing the top of the container 100. A top frame 108 inserts into the upper end of the container 100. A base 110 provides a bottom support for the container and the goods packaged therein.

The panels 102–105 are provided with vertical reinforcement cleats 112 (shown in phantom on panels 103 and 104), which are cut to length from the structural member 10. As illustrated in FIG. 1, the structural member 10 has square-cut exterior sides and edges for facilitating attachment of the cleats 112 to the panels 102–105. The corner and centrally disposed cleats 112 attach to the corrugated outer body 100 in a conventional manner. These conventional methods of attachment include gluing, stapling, or a combination, such as used for attaching wood cleats. Machinery for attaching cleats to corrugated paperboard bodies is conventional in the container industry. The corrugated body serves to enclose, contain, and brace the cleats to provide both torquing and racking strength for handling and stacked shipment. The corrugated container provides a dust and damage protection barrier for the product in the container. Such containers are typically printed with advertising, part numbers, and product information.

Figure 5:
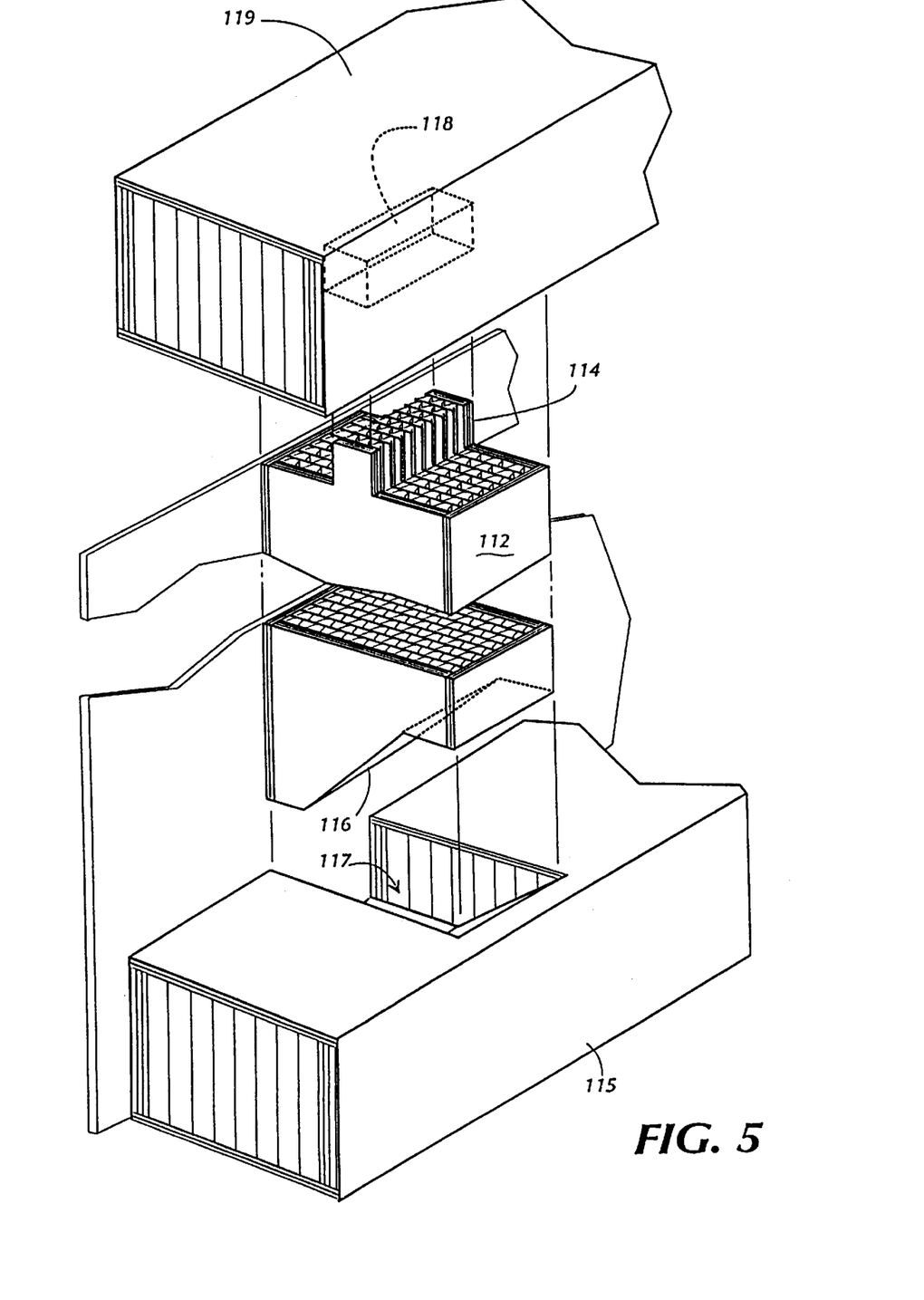
FIG. 5 is a detailed exploded perspective view of a cleat made from the structural member illustrated in FIG. 1, having an end tenon that inserts into a mortise of a cross member and a bevel end that mates to a bevel cut in a second cross member, for use in a shipping container.

As best illustrated in FIG. 5, the cleats 112 are cut at an upper end to form a tenon 114 and at a bottom end to form a bevel 116. The tenon 114 locks into a corresponding mortise 118 in a member 119 of the top frame 108. The tenon and mortise joint prevents the top frame 108 from being dislodged from the vertical cleats. The thickness of the tenon is preferably about one-third the thickness of the column 110. The tenon cap is preferably between about one-third and one-half the thickness of the cleat 112. The tenon width preferably is the full width of the cleat 112. The bevel 116 is matingly received by a cutout 117 in a cross-member 115 made of the structural member 10. A bevel similar to the bevel 116 is further discussed below with respect to FIG. 6c.

Figure 6A:
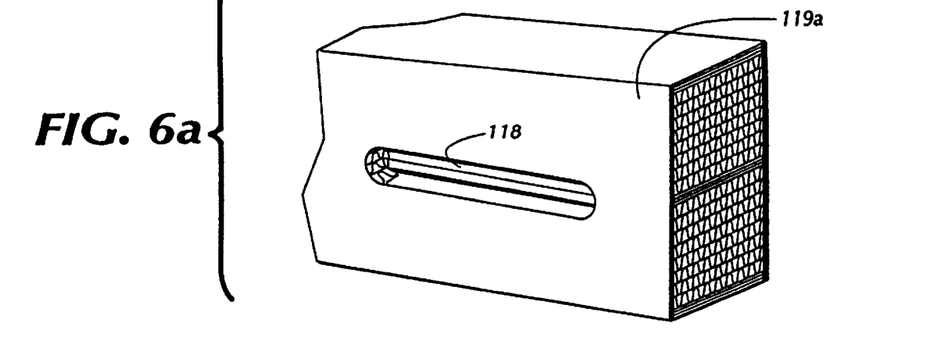
FIG. 6a is a side perspective view of a mortise in a structural member illustrated in FIG. 1.
Figure 6B:
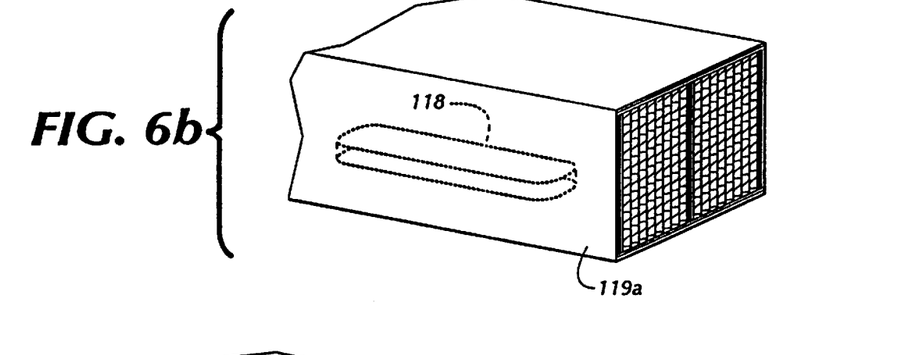

With reference again to FIG. 4, top frame 108 assembles from a plurality of members cut from the structural member 10. The ends 124 are cut for lap joints to rigidly connect the members together. The lap joints are preferably glued together with an adhesive. The frame members, for example 119a, include a mortise 118 for receiving the tenon 114 of the cleat 112. FIGS. 6a and 6b are detailed bottom and side views of the mortise 118 cut in the member 119a. The mortise 118 preferably is cut with a standard wood working slot mortiser to receive the rectangular-shaped tenon 114 of the cleat 112. The mortise 118 preferably has a width about ³⁄₁₆ of an inch wider than the thickness of the tenon 114. This facilitates an easy fit during assembly of the container 100 on a pack line. The depth of the mortise 128 is substantially the same as the depth of the tenon 114. In a preferred embodiment the length of the mortise is approximately ¼ to ½ inch longer than the width of the cleat 112.

Figure 6C:
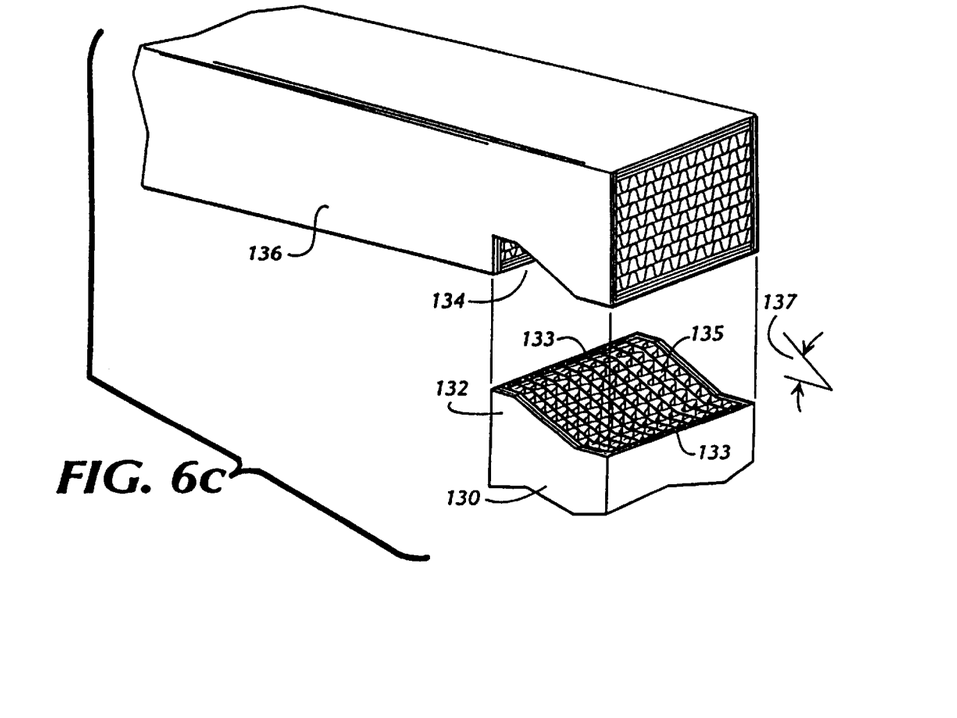
FIG. 6c illustrates a cleat made from the structural member illustrated in FIG. 1, having a bevelled upper end that engages a bevel notch in a cross member, for use in a shipping container.

FIG. 6c is a perspective exploded view of a cleat 130 having a beveled tenon 132 at a first end with a pair of plateau surfaces 133 adjacent the sloping surface 135. A mating groove 134 is cut in a transverse frame member 136 for receiving the beveled tenon end 132. The groove 134 is cut with a conventional wood working tenoner with a profile blade in the shape of the groove. In a preferred embodiment, the angle 137 of the bevel is about 24°. The height of the bevel is approximately ½ the width of the thickness of the cleat 130. The plateau surfaces 133 are approximately ¼ the thickness of the cleat 130. In a preferred embodiment, the cleat 130 attaches to a side wall of a corrugated container having top flaps, such as that illustrated in FIG. 4. The top flaps close down tightly over a frame made of the cross member 136. This forces the mortise-tenon joint to remain tight. The plateau surfaces 133 transfer the top load on the cross member 136 to the vertical cleat 130.

In one embodiment of the present invention, a cleat was manufactured with three plies of solid fibreboard for the top and bottom caps 16 and 18 sandwiching four double-wall corrugated plies 12. Two plies of solid fibre sheet were used as the side caps 20 and 22. The solid fibre sheets were 90 point fibre. A 30 inch cleat having a width of two inches and a thickness of one and one half inches supported a 1500 pound compression load. The tenon 114 was one half inch thick and had a depth of between one half inch. This particular cleat was sized for attaching to the inner surface of a corrugated paperboard container 100 while still allowing the container to collapse flat for shipment to the user. Such flat shipping is known in the industry as knock-down. The containers are typically shipped to an end user in a knock-down position to save space and freight costs.

Figure 7A:
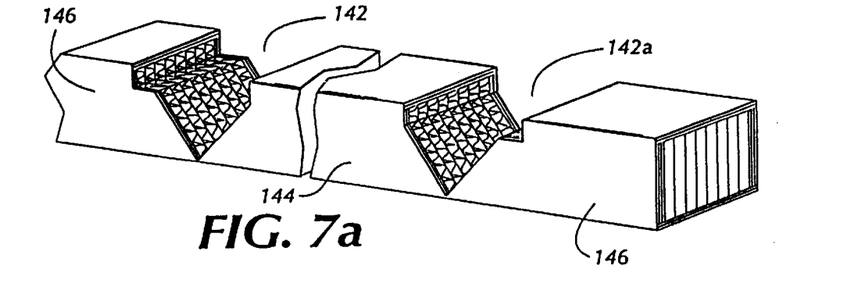
FIG. 7a is perspective view of a foldable framing member manufactured from the structural member illustrated in FIG. 1.
Figure 7B:
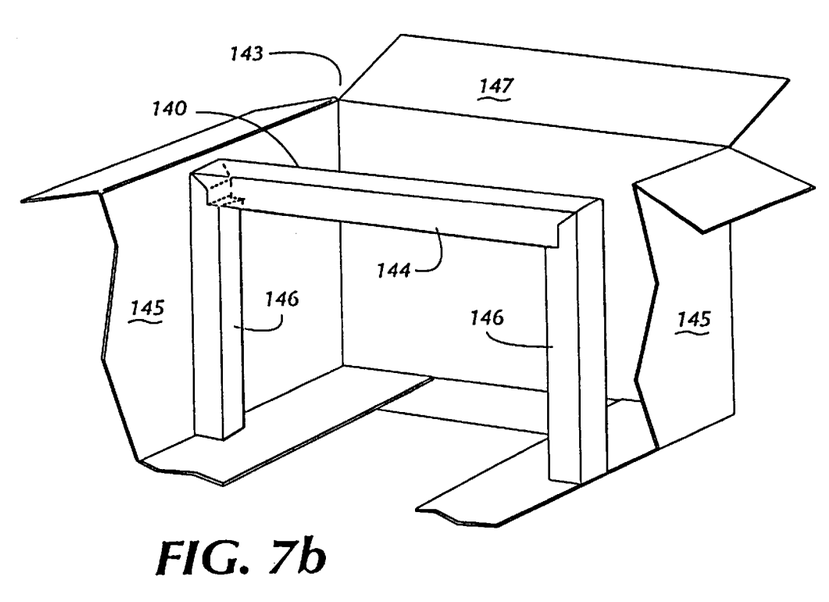
Figure 7C:
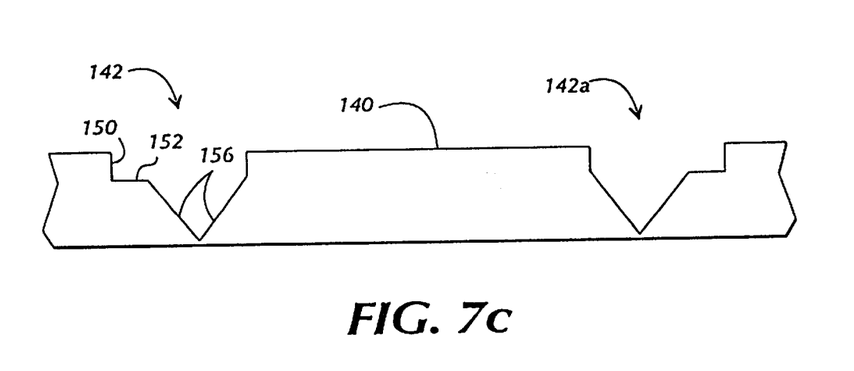

The structural member 10 of the present invention can be formed into an integral U-shaped structural brace 140 illustrated in FIGS. 7a, 7b, and 7c. The brace 140 facilitates use of a reinforced post or column in shipping containers which are not supplied with a cleat already secured to the side wall. With reference to FIG. 7a, the structural member 10 is cut with two spaced-apart notches 142 to define a top brace 144 and two vertical columns 146 as a continuous unit. The end user folds the structural member 10 at the notches 142 to form the U-shaped brace 140 as illustrated in FIG. 7b. The U-brace 140 is placed in a container 143 (partially illustrated). The columns 146 are stapled or glued conventionally to the side walls 145 of the container 143. One or more of the U-braces 140 can be centrally disposed in a longitudinal container for vertical and top load support between the ends of the container. A cap, or flaps 147, contact the top brace 144 to close the container.

FIG. 7c illustrates a side view of the brace 140. The notch 142 preferably has a length of 1.5 times the thickness of the structural member 10. The notch 142 includes a seat 148 with a bottom 150 and a side 152. The depth and width of the seat 150 is preferably ½ the thickness of the structural member 10. Adjacent the seat is a beveled surface 156. The angle of the bevel is preferably 45° for folding the columns 146 and the top brace 144 to a square 90° corner. A mirror image of the notch 142 forms the second notch 142a in the structural member 10 for forming the U-shaped brace 140. The square-off bottom 150 and side 152 provides a flat surface for transferring the top load to the vertical columns 146 and preventing the side columns from being forced outwardly.

Figure 8A:
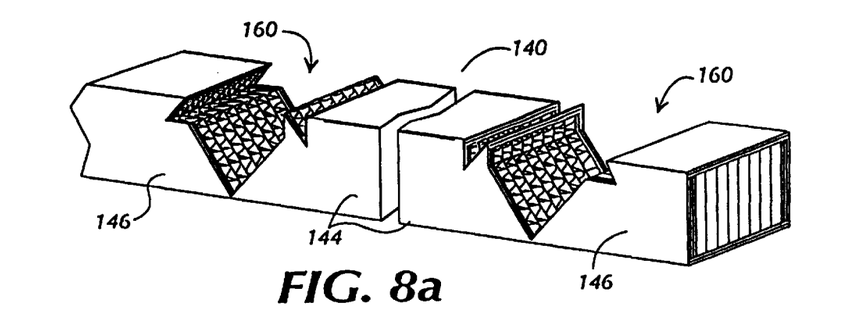
FIG. 8a is a an alternate embodiment of the foldable framing member illustrated in FIG. 7a having a locking corner notch.
Figure 8B:
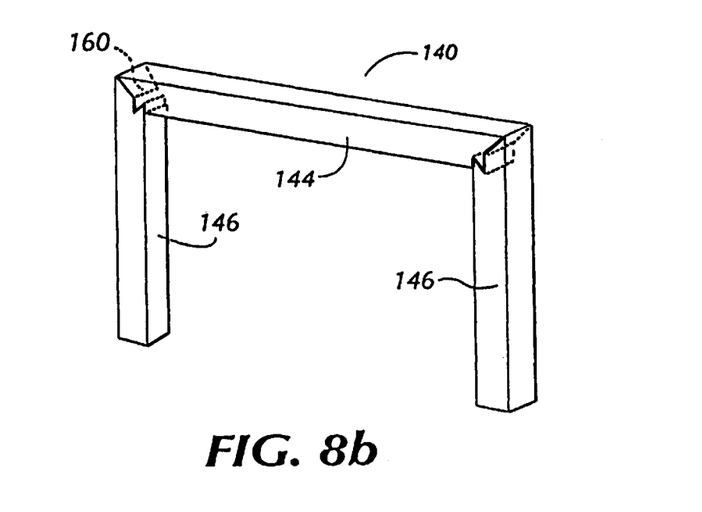
FIG. 8b is a perspective view of the framing member illustrated in FIG. 8a, folded to form a frame member for a container.
Figure 8C:
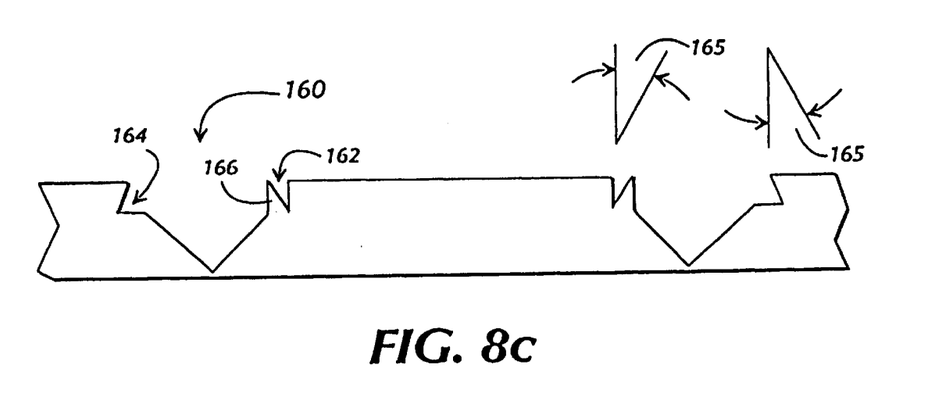

FIGS. 8a, 8b, and 8c illustrate a U-brace 140 with an alternate embodiment 160 of the notch 142. The notch 160 locks the top brace 144 to the corner columns 146 with resistance to both internal and external lateral pressure. The notch 160 must be cut on a multi-head tenoner because of a pair of backcuts 162 and 164 illustrated in FIG. 8c. The angle 165 of the backcuts are preferably 20°. The backcut 162 forms a tooth 166 that inserts into the backcut 164 to lock the columns 146 to the top brace 144. The backcuts 162 and 164 cooperate to transfer the load on the top brace 144 to the vertical columns 146.

In both notches 142 and 160 of FIGS. 7 and 8, the outermost plies of the solid fibre bottom cap 16 are not cut but remain as a hinge to join the columns to the top brace. The U-brace 140 illustrated in FIGS. 7 and 8 are collapsible, clean, free of moisture, sawdust, insects and corrosive acids. The U-brace 140 of the present invention is shipped flat and banded in bundles. Bundled together, the U-braces 140 occupy a relatively small amount of warehouse space. This saves freight costs and warehouse costs. The braces 140 are fully recyclable in the same manner and at the same location as corrugated paperboard. The structural members 10 are preferably formed with a high percentage of recycled fibre, thus forming a closed loop in the recycling system.

Figure 9:
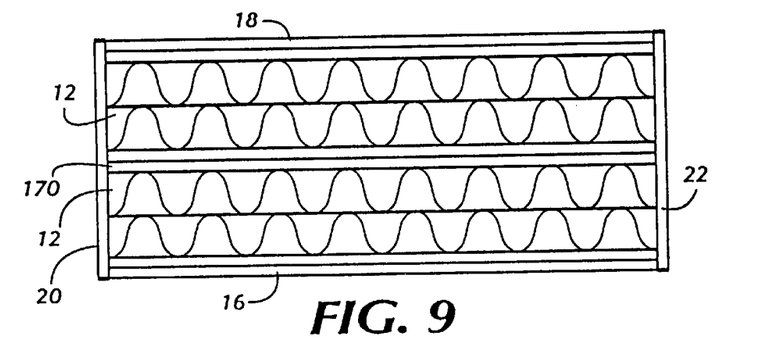
FIG. 9 is an end view of an alternate embodiment of the structural member illustrated in FIG. 1, having a web disposed between interior corrugated paperboard sheets.

FIG. 9 is an end view of an alternate embodiment of the structural member 10 illustrated in FIG. 1. In this embodiment, a web 170 formed of a pair of solid fibreboard sheets, is disposed centrally in the core between a pair of corrugated sheets 12. In this embodiment, the side caps 20 and 22 are single plies of fibreboard sheets; the bottom and top caps 16 and 18 are double plies.

Figure 10:
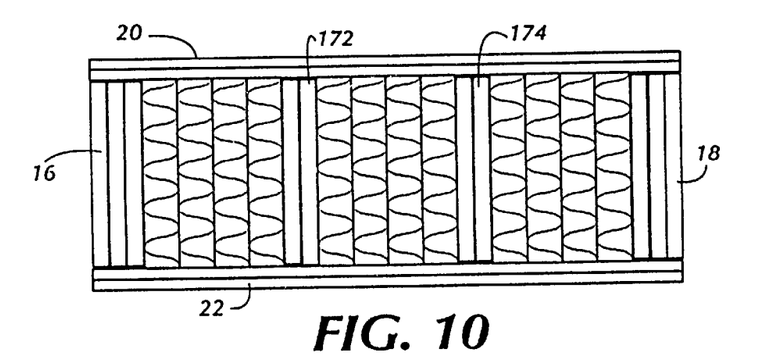
FIG. 10 is an end view of an alternate embodiment of the structural member illustrated in FIG. 1, having a pair of webs equally disposed between the sides of the structural member.

FIG. 10 is an end view of an alternate embodiment of the structural member 10 illustrated in FIG. 1. In this embodiment, a pair of webs 172 and 174 are equally disposed between the caps 16 and 18 of the structural member 10. In this embodiment, the structural member 10 has three sets of corrugated paperboard sheets and each set has two of the corrugated sheets 12. The caps 16 and 18 are three plies of fibreboard; the sides are two plies.

Figure 11:
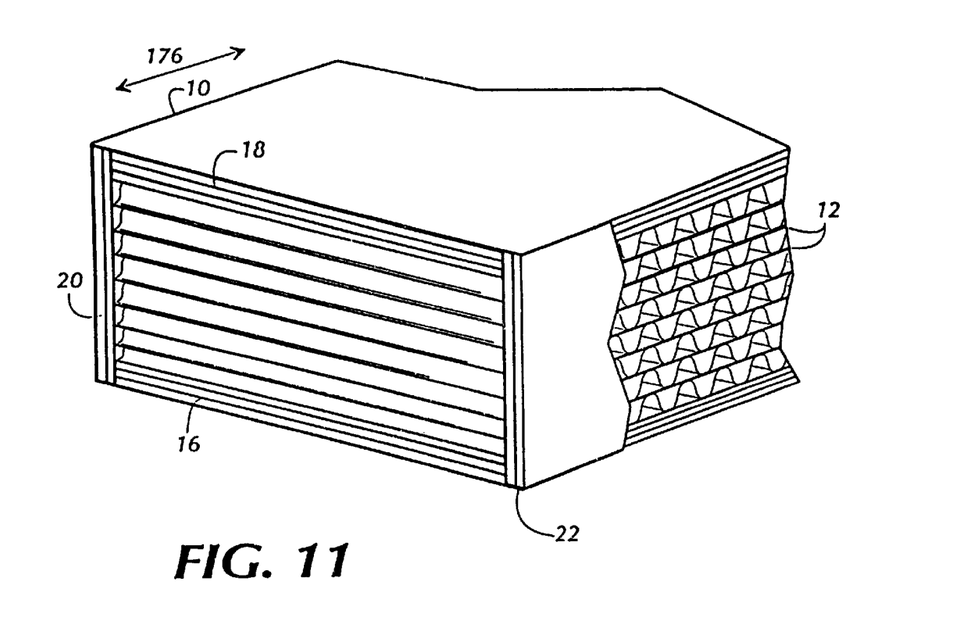
FIG. 11 is a perspective end and side view of an alternate embodiment of the structural member illustrated in FIG. 1, having corrugated sheets disposed with the flutes of the corrugations transverse to a longitudinal axis of the structural member.

FIG. 11 is a perspective end and side view of an alternate embodiment of the structural member 10 illustrated in FIG. 1. In this embodiment, the corrugated paperboard sheets 12 are disposed with the flutes of the corrugations transverse to a longitudinal axis 176 of the structural member 10.

The present invention accordingly provides a substitute structural member 10 having reduced weight with sufficient top load compression strength for use as a cleat in a corrugated paperboard container for heavy goods. The structural member 10 is readily manufactured and processed with wood-cutting equipment typically used n the industry for forming frame members and joints sufficiently rigid to withstand handling, stacking, and shipping.

The principals, preferred embodiments, and modes of operation of the present invention have been described in the foregoing specification. The invention is not to be construed as limited to the particular forms disclosed because these are regarded as illustrative rather than restrictive. Moreover, variations and changes my be made by those skilled in the art without departing from the spirit of the invention as described by the following claims.

What is claimed is:

1. A method of making an elongated beam structural member having an interior attachment structure of corrugated paperboard sheets of a first density which interior attachment structure is capable of being machined to form joints using the tubular beam structural member, comprising the steps of:

(a) applying an adhesive coating to an exterior surface of an elongate corrugated paperboard sheet comprising at least one liner and a sheet of flutes to make a coated corrugated paperboard sheet;

(b) repeating step (a) to assemble a stack of a plurality of said coated corrugated paperboard sheets of a first density bonded together with the coated surface of each of the corrugated paperboard sheets engaged to an adjacent sheet;

(c) sandwiching the stack between adhesively coated fibreboard sheets having a second density greater than the first density to form a sandwiched stack;

(d) applying at least one separation layer of a corrugated paperboard sheet to the sandwiched stack;

(e) adding a second said stack sandwiched between adhesively coated fibreboard sheets to said separation layer to define a billet comprising at least the two stacks separated by the separation layer;

(f) ripping the billet along a line perpendicular to the stacked corrugated paperboard sheets and spaced inwardly of a side edge of the billet to yield a core plank;

(g) ripping said core plank along said separation layer in a direction parallel to the sheets of coated corrugated paperboard sheets to define elongate core planks having a low-density interior structure of coated corrugated paperboard sheets; and (h) cutting the elongate core planks to length to form an elongated beam structural member for making components of packaging.

2. The method as recited in claim 1, further comprising the step (i) attaching a pair of caps of fibreboard sheet having the second density to opposing sides of the core plank that are perpendicular to the stacked corrugated paperboard sheets after step (f) and prior to step (g), wherein the caps and the fibreboard sheets adjacent the separation layers cooperate to define a tubular box-beam with an interior structure of the corrugated paperboard for machining in order to attach one tubular beam structural member to another tubular beam structural member while the caps and the fibreboard sheets provide an exterior having a resistance to compression for the tubular beam structural member.

3. The method as recited in claim 2, wherein the billet contains at least three separation layers and the ripping step (g) rips through a first separation layer and each second successive separation layer thereafter to define a core plank having unripped separation layers, whereby the pair of caps and the high-density fibreboard sheet adjacent the unripped separation layer defines in cross-sectional view an I-beam.

* * * * *